J. G. REBER, DEC'D.

SEFTON MANUFACTURING CORPORATION, ASSIGNEE.

PACKING BOX OR CARTON.

APPLICATION FILED APR. 17, 1917.

Reissued Aug. 19, 1919.

14,716.

3 SHEETS—SHEET 1.

Witnesses
Martin H. Olsen.
Robert Dobbermann

APPLICANT
John G. Reber (deceased)
By Rector, Hibben, Davis & Macauley
Attys

THE COLUMBIA PLANOGRAPH CO., WASHINGTON, D. C.

J. G. REBER, DEC'D.

SEFTON MANUFACTURING CORPORATION, ASSIGNEE.

PACKING BOX OR CARTON.

APPLICATION FILED APR. 17, 1917.

Reissued Aug. 19, 1919.

14,716.

3 SHEETS—SHEET 2.

Witnesses
Martin H. Olsen.
Robert Dobberman

APPLICANT

John G. Reber (deceased)
By Reeve, Nelson, Davis & Macauley
Atty's.

J. G. REBER, DEC'D.

SEFTON MANUFACTURING CORPORATION, ASSIGNEE.

PACKING BOX OR CARTON.

APPLICATION FILED APR. 17, 1917.

Reissued Aug. 19, 1919.

14,716.

3 SHEETS—SHEET 3.

Witnesses
Martin H. Olsen.
Robert Dobbeman

APPLICANT
John G. Reber (deceased)
By Reeder, Milburn, Davis & Macauley
Atys

THE COLUMBIA PLANOGRAPH CO., WASHINGTON, D. C.

UNITED STATES PATENT OFFICE.

JOHN G. REBER, DECEASED, LATE OF CHICAGO, ILLINOIS, BY SEFTON MANUFACTURING CORPORATION, OF MILLBROOK, NEW YORK, AND CHICAGO, ILLINOIS, A CORPORATION OF NEW YORK, ASSIGNEE, BY MESNE ASSIGNMENTS.

PACKING BOX OR CARTON.

14,716. Specification of Reissued Letters Patent. Reissued Aug. 19, 1919.

Original No. 893,652, dated July 21, 1908, Serial No. 242,392, filed January 23, 1905. Application for reissue filed April 17, 1917. Serial No. 162,802.

*To all whom it may concern:*

Be it known that JOHN G. REBER, now deceased, who formerly resided at Chicago, Cook county, Illinois, invented certain new and useful Improvements in Packing Boxes or Cartons, now owned by SEFTON MANUFACTURING CORPORATION, assignee of said JOHN G. REBER, by mesne assignments, of which the following is a specification.

Said invention relates to packing boxes or cartons of the collapsible type and more particularly to boxes or cartons for the packing and shipping of bottles and the like.

The object of said invention is to provide a packing or carton of this character so constructed and arranged as to provide great strength and rigidity and thereby produce a package or carton in which bottles may be packed and shipped with practically absolute safety.

Figure 1:
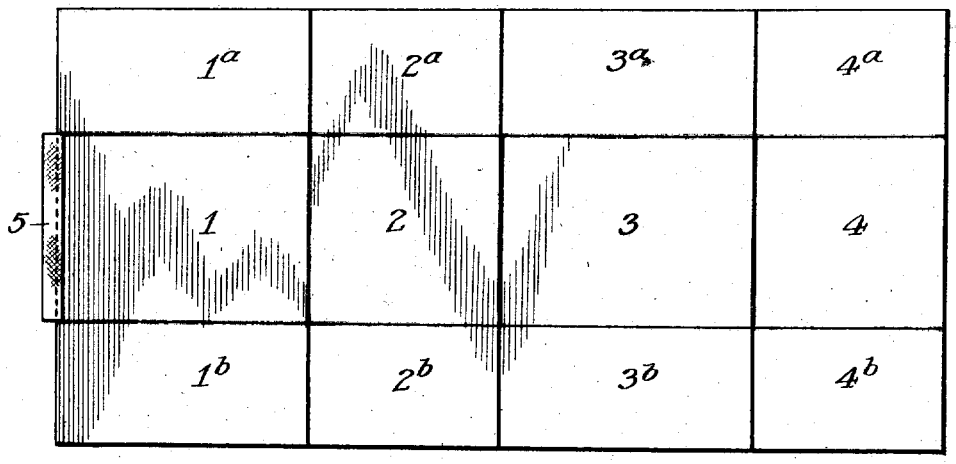
Figure 2:
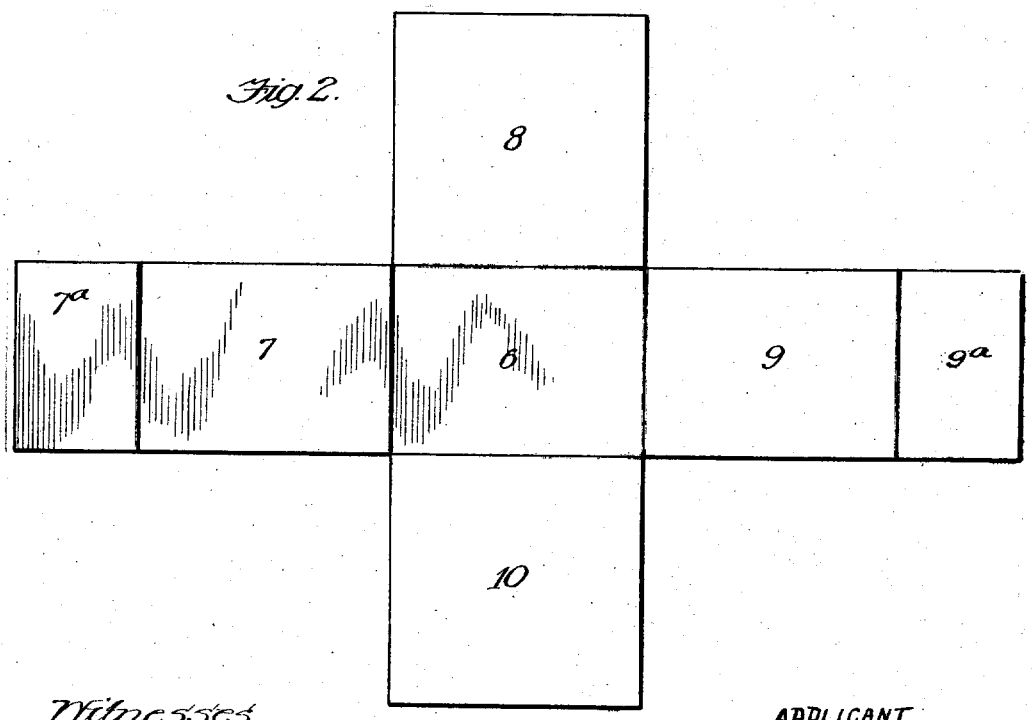
Figure 3:
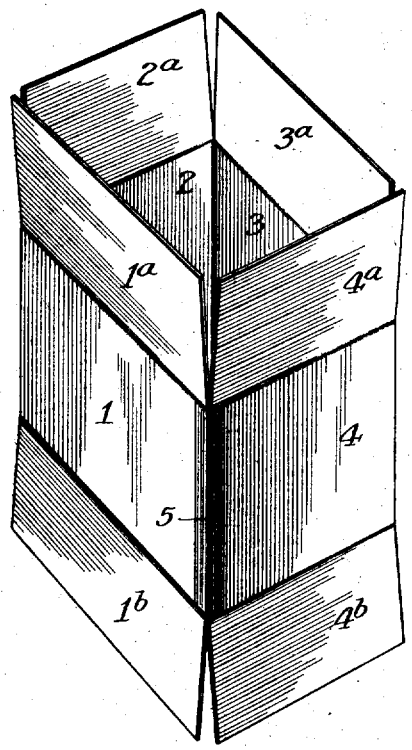
Figure 4:
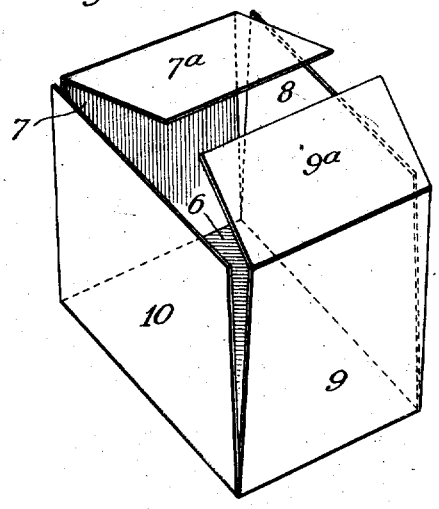
Figure 5:
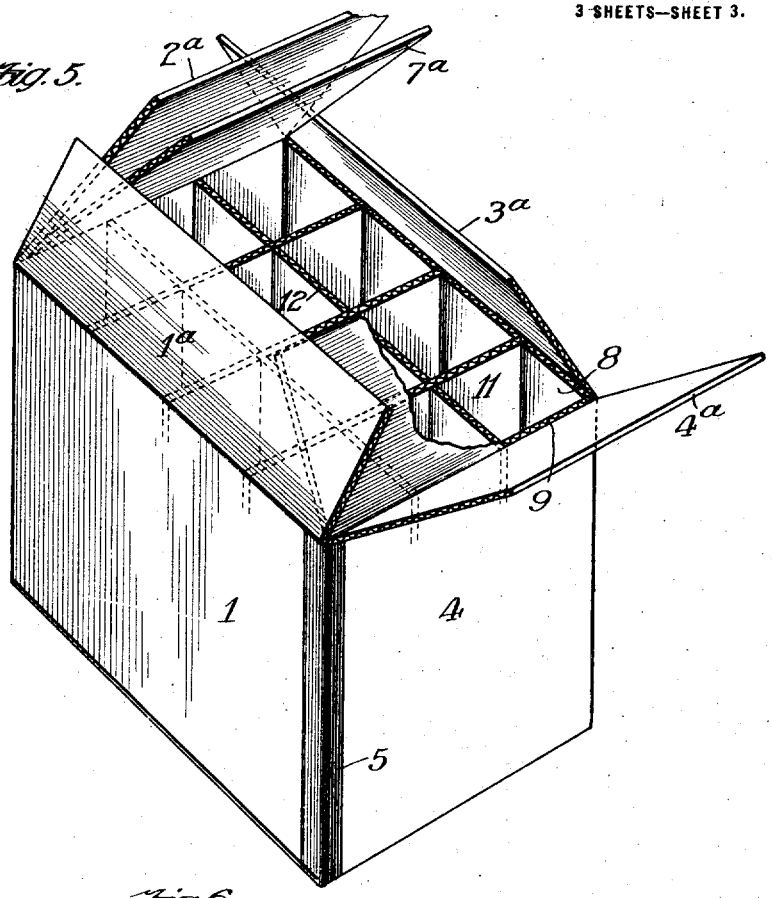

In the drawings, Figure 1 is a plan view of the blank forming the outer portion of the box; Fig. 2 a similar view of the blanks or parts forming the inner portion of the box or carton; Fig. 3 is a perspective of the outer portion of the box set up ready for use; Fig. 4 a similar view of the inner portion of the box; Fig. 5 a perspective of the box assembled with a portion thereof broken away to expose the bottle compartments therewithin, and Fig. 6 a transverse section of the box or carton illustrating bottles therewithin.

In general terms, the box comprises an outer portion or shell which is illustrated in Fig. 3, an inner portion or shell as illustrated in Fig. 4 and also by preference a set of transverse cross strips arranged within the inner portion or shell and forming the bottle compartments, as seen in Fig. 5. Furthermore, for the purpose of obtaining the greatest strength and rigidity, double-faced corrugated paper board is employed as the material of which the box is made.

As illustrated in Fig. 1, the upper portion or shell of the box or carton comprises the four sides or walls 1, 2, 3 and 4, which are hinged together, the outer edges of the sides 1 and 4, being hinged together by means of the strip or tape, 5. These sides are provided with extensions or flaps at the top and bottom and marked $1^a$ and $1^b$ for the top and bottom extensions of the wall, 1 and $2^a$ and $2^b$ for the corresponding parts of the wall, 2, and so on with the sides 3 and 4. These top and bottom extensions are adapted to fold inwardly to form double thickness of top and bottom for the outer box or shell. When the tops and bottoms are square, the extensions are of equal size and constitute one half of the top or bottom, as the case may be, the extensions being folded inwardly in pairs, that is, first two opposite extensions and then the remaining opposite extensions. However, in case the box is oblong and not square, two of the opposite extensions at the top and bottom are shorter than the others, and do not together equal in area the area of the top or bottom, like the remaining two, in which event the shorter extensions should be first folded in, whereas it makes no difference which pair of extensions are folded first if the box or carton is square in cross section.

The inner box or shell, as illustrated in Fig. 4, is composed of the rectangular bottom 6, corresponding in size with the cross section of the outer box or shell, in order that such bottom may fit snugly therewithin. This bottom is provided with the four sides, 7, 8, 9 and 10, hinged thereto, and by preference disconnected from each other but meeting at the corners when the box or carton is assembled. Two of the sides—in the present instance the sides 7 and 9—are provided with the end extensions or flaps, $7^a$ and $9^a$, respectively. All of the parts of the inner box or shell may be formed from a single piece, but in the present instance the bottom is formed integral with the sides 7 and 9, whereas the sides, 8 and 10, are made separate therefrom and hinged thereto in the usual manner, as by means of strips or tapes, but it is evident that the sides, 8 and 10, may be integral with the bottom, 6, and the sides, 7 and 9, separate from, but hinged to such bottom. In the present instance, the flaps or extensions, $7^a$ and $9^a$, which when the box is assembled for use, are folded inwardly and downwardly to horizontal position, together form the entire top of the box, each flap being substantially one half the size of the area of the top, although, if desired, the top may be composed wholly of a single extension hinged to one of the sides or substantially of a single extension, in which latter case, in order to get the strength of the corner, the side opposite the single extension may have a very slight extension or turned over upper edge to meet the said single extension.

Figure 6:
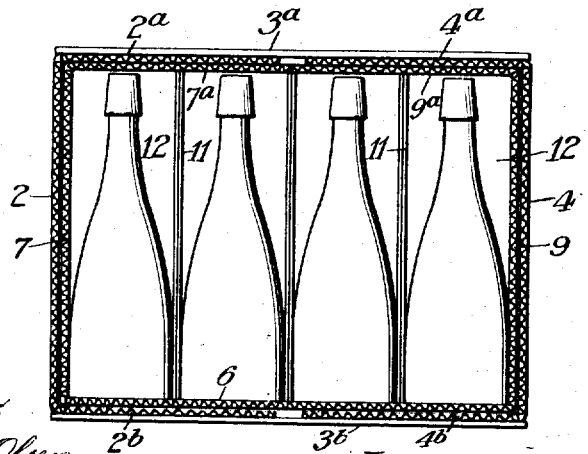

The bottle compartments, as illustrated in Figs. 5 and 6, are produced by a series of cross strips, 11 and 12, arranged at right angles and interlocking with each other, these cross strips thus forming the compartments which in their entirety equal in all their dimensions the interior dimensions of the inner box or shell, with the result that the strips strengthen and support not only the sides of the complete box, but also the top and bottom, so that all strains and pressures can be effectually resisted and all danger to the packed articles, such as bottles, may be avoided.

It will be understood that the packing box or carton, which is rectangular, may be made of any desired dimensions and proportions, and also that the number and size of the bottle compartments may be varied or changed according to the size of the bottle or the desired capacity of the box, in the present instance there being twelve compartments capable of containing twelve bottles. It will also be understood that the parts composing my box or carton are collapsible, so that they may be transported in the flap and set up for use by the consumer, as he requires the boxes or cartons.

In practice, and speaking of the preferable mode of procedure, the outer box or shell is first set up with the bottom flaps inwardly folded, the extensions of two opposite sides being first folded down to form one of the bottoms, and then the extensions or flaps on the other two sides being folded down upon the first or inner bottom. At this time, the flaps forming the tops of the outer box or shell are left flaring upwardly as seen in Fig. 3, until the inner shell is inserted. The inner shell is now inserted, whereupon the sides thereof necessarily fold upwardly, substantially to the form seen in Fig. 4 and the inner shell in this form is then slid downwardly to the bottom of the outer shell. The box is now inverted or stood on its upper end, it being understood that the flaps or extensions, $1^a$, $2^a$, $3^a$, and $4^a$, not having been folded are comparatively stiff for the purpose and moreover that the box is further supported in this position by the extensions, $7^a$ and $9^a$, which now project from the top of the box equally with said extensions of the outer shell. The inner section of the double bottom of the outer shell is now glued to the bottom, 6, of the inner shell and the outer section of such double bottom is thereupon glued to its inner section. The compartments are now inserted in the inner shell. After the bottles are packed in the compartments, the extensions, $7^a$ and $9^a$, of the inner shell, are now folded down to form the innermost top of the box, such flaps resting upon the upper edges of the cross strips forming the compartments. The extensions of the two opposite sides of the outer box are now folded down upon the extensions, $7^a$ and $9^a$, to form the second or intermediate top of the completed box or carton and glued to such innermost top, after which the extensions of the other two sides are folded down upon such intermediate top and pasted or glued thereto. In Fig. 5 is shown the complete or assembled box, just before the extensions or flaps of the top are folded down. After the box or carton is thus completely assembled, by preference, a tape or band is run around the box, over the meeting edges of the outermost extensions forming the top and bottom, the ends of which tape are securely sealed.

As hereinbefore stated, when the box is of any other rectangular form than the square, the shorter extensions are folded down first, and the full extensions folded last, with their meeting or adjacent edges abutting or substantially so, but in either event the opposite extensions are folded down together in pairs so that the joints are broken or formed at right angles to each other, and this arrangement is continued as to the joint in the top of the inner box.

The packing box or carton constructed and arranged as above described, possesses great strength and such box, with comparatively fragile articles, such as bottles, may be transported or shipped and subjected to usage and abuse without permitting articles therewithin to be damaged or broken. All the sides, as well as the top and bottom of the box are securely braced and moreover each part or section of the complete box or carton assists the other in resisting strains and pressures, and thereby protecting the contained articles.

I claim:

1. A folding receptacle comprising an inner box of stiff material capable of being creased consisting of a bottom, having hinged thereto the four sides, two of which sides are provided with extensions constituting a top or cover, and an inclosing outer box of similar material consisting of the four sides hinged together and provided with extensions forming a top and bottom of double thickness and adapted to fit over upon the inner box and form double thickness of sides or walls and triple thickness of top and bottom; substantially as described.

2. A folding receptacle comprising an inner end and an outer box portion, the inner box consisting of a bottom, 6, having hinged thereto the four sides, 7, 8, 9, and 10, two of which sides are provided with extensions, 7ª and 9ª, adapted to fold inwardly and together to form the top of the inner box, and the outer box consisting of four sides, or walls corresponding in size to the sides, 7, 8, 9 and 10, one or more of said walls having top and bottom extensions to form top and bottom covers or closures for the outer box and constituting additional top and bottom closures for the inner box; substantially as described.

3. A folding packing box or receptacle comprising an inner and an outer box portion and also a series of strips fitting upon each other, and, when inserted in the inner box, forming compartments for receiving bottles or the like, the inner box consisting of a bottom, four sides hinged thereto, one or more of which sides is provided with end extensions adapted to fold inwardly in pairs from opposite sides to form the top of such inner box, and the outer box consisting of four sides or walls corresponding in size to the sides of the inner box, one or more of said walls having extensions to form top and bottom covers or closures for the outer box; substantially as described.

4. A folding receptacle comprising an inner box consisting of a bottom, having hinged thereto the four sides, two of which sides are provided with extensions constituting a top or cover, and an inclosing outer box consisting of the four sides hinged together and provided with extensions forming a top and bottom of double thickness and adapted to fit over upon the inner box and form double thickness of sides or walls and triple thickness of top and bottom, the parts of the different tops and bottoms breaking joint with each other; substantially as described.

5. A folding packing box or receptacle comprising an inner and an outer box portion, the inner box consisting of a bottom, four sides hinged thereto, two of the opposite sides being provided with end extensions which, when folded inwardly, form the top of such inner box, and the outer box consisting of four sides hinged together and extensions at the opposite ends of these last named sides to form double tops and bottoms for the outer box, two of the opposite extensions at the top and bottom of such outer box being foldable inwardly and secured to the top and bottom respectively of the inner box and forming the inner section of the double top and bottom of the outer box, and the remaining extensions at the top and bottom of such outer box being foldable inwardly and secured to the inner section of the double top and bottom respectively of the outer box; substantially as described.

6. A folding packing box or receptacle comprising an inner and outer box portion formed from two separate blanks of double faced corrugated board, the inner box consisting of a bottom and four sides hinged thereto, two of the opposite sides thereof being provided with end extensions which, when folded inwardly form the top of such inner box, said inner box when assembled forming a complete and closed box, and the outer box consisting of four sides hinged together and provided at their opposite ends with extensions which are foldable inwardly in pairs to form the top and bottom of such outer box with double thicknesses of material, said pairs of end extensions being secured together to close and seal the top and bottom of the box; substantially as described.

[L.S.] SEFTON MANUFACTURING CORPORATION,
*Assignee of John G. Reber, deceased.*
By JAMES E. CLENNY,
*Vice President.*

Attest:
W. J. EVANS, Jr.,
*Secretary.*

Copies of this patent may be obtained for five cents each, by addressing the "Commissioner of Patents, Washington, D. C."